Patented June 16, 1942

2,286,466

UNITED STATES PATENT OFFICE 2,286,466

OIL ACID-MODIFIED POLYHYDRIC ALCOHOL-POLYBASIC ACID RESIN

Edwin T. Clocker, Bethlehem, Pa.

No Drawing. Application May 4, 1939,
Serial No. 271,719

14 Claims. (Cl. 260—22)

My invention relates to methods of producing an improved condensation product suitable for use in resins, lacquers, paints, varnishes, enamels, plastic masses, and for other similar purposes and to the new product so produced.

This application is a continuation in part of my co-pending application, Serial No. 759,086, filed December 24, 1934, now Patent No. 2,188,- 882 and Serial No. 165,898, filed September 27, 1937, now Patent No. 2,188,885 both for Condensation product and method.

A purpose of my invention is to produce an improved condensation product by causing condensation between an alkyl mono-substituted or alkyl di-substituted olefinic acid having less than ten carbon atoms in the carbon chain and a compound of the group consisting of nonconjugated unsaturated nonhydroxylated aliphatic acids having from ten to twenty-four carbon atoms in the carbon chains; salts thereof; esters thereof or similar compounds. As explained below any relatively short chain compound containing the ethylene linkage in condensable form may be condensed with any nonconjugated unsaturated nonhydroxylated aliphatic acid or the like having from ten to twenty-four carbon atoms in its carbon chain.

A further purpose is to cause a condensable ethylene type compound having less than ten carbon atoms in its carbon chain to attach to the carbon chain of a nonconjugated unsaturated nonhydroxylated fatty acid or the like by suitable application of heat and, desirably also, pressure. A temperature of between 150° C. and 300° C. is preferred for the reaction, 180° C. to 260° C. being the most satisfactory range. A temperature in excess of 150° C. is desirably maintained for a time of at least three-quarters of an hour and sufficient to produce substantial condensation. Good results are obtained using a temperature not less than 150° C. and in excess of the ordinary boiling point of the condensable ethylene type compound with return condensation.

A further purpose is to cause one molecular equivalent of a condensable ethylene type compound having less than ten carbon atoms in its carbon chain to condense with one molecular equivalent of a nonconjugated unsaturated nonhydroxylated carbon chain compound having from ten to twenty-four carbon atoms in the carbon chain.

A further purpose is to partially or completely saturate the double bonds of a nonconjugated unsaturated nonhydroxylated fatty acid, fatty oil or the like by an alkyl mono- or di-substituted olefinic acid having less than ten carbon atoms in the carbon chain.

A further purpose is to condense maleic anhydride or the like with a drying oil such as linseed oil, and to cause the condensation product to dry in air at ordinary temperatures or at elevated temperatures, either in the presence of a drier or without a drier.

A further purpose is to produce my novel condensation product in a form which has a polar-reactive group.

A further purpose is to cause the acid or acid anhydride group of a condensation product of an alkyl-substituted olefinic acid or acid anhydride having less than ten carbon atoms in its carbon chain with a nonconjugated unsaturated nonhydroxylated fatty acid or the like having from ten to twenty-four carbon atoms in its carbon chain to react with other compounds such as metal salts or metals.

A further purpose is to produce an improved varnish or the like from the condensation product of an olefinic acid having less than ten carbon atoms in its carbon chain and a nonconjugated unsaturated nonhydroxylated drying oil, by the addition of an alcohol which will combine with the acid group and also of a resin, suitably heating the ingredients to varnish viscosity and thinning with a suitable solvent.

Further purposes appear in the specification and in the claims.

It has been known for some time that maleic anhydride or substances yielding maleic anhydride will condense with carbon chain compounds containing a conjugated system of double bonds. For example, Morrell, Marks and Samuels in British Patent No. 407,957 discloses a condensation of maleic anhydride with tung oil, a conjugated compound.

I have discovered that, under suitable conditions, maleic anhydride and compounds which behave similarly, as discussed below, will react with nonconjugated unsaturated nonhydroxylated fatty oils and acids and similar compounds having from ten to twenty-four carbon atoms in the carbon chain to produce a wide variety of products depending upon the characters of the reacting substances and the subsequent reactions to which the condensation products are subjected.

The maleic grouping must be present in condensable form, preferably as maleic anhydride. The condensation is of course obtained from any of the compounds which yield maleic anhydride, such as malic acid, fumaric acid or maleic acid. The production of maleic anhydride from such other acids is well known in the art (Bernthsen, Textbook of Organic Chemistry (1923) pages 250-256). Instead of maleic anhydride, an ester of maleic acid, whether an acid or completed ester, may be used; also a substituted maleic acid.

Investigation of a large number of compounds has shown that condensation with a nonconjugated unsaturated nonhydroxylated aliphatic acid having from ten to twenty-four carbon atoms in the carbon chain is generally characteristic of chain compounds having the ethylene linkage and having less than ten carbon atoms in the carbon chains, which are substituted on one or both sides of the double bond to form acids or acid anhydrides, or similar compounds. These compounds are olefinic as they are acyclic and have the ethylene linkage. Such olefinic compounds are mono-substituted when they contain only one acid, acid anhydride or esterified group; for example crotonic acid. Such olefinic compounds are di-substituted when they contain two acid, acid anhydride or esterified groups; for example maleic anhydride, citraconic anhydride, maleic acid, acid methyl maleate.

When I refer to the olefinic compound of less than ten carbon atoms in the carbon chain as having the ethylene linkage in condensable form, I mean to indicate that the compound is not a hydrocarbon, for example, but that it is an acid or acid anhydride or an ester or half ester thereof or a similar compound which will condense with a nonconjugated unsaturated nonhydroxylated fatty acid or the like having from ten to twenty-four carbon atoms in the carbon chain.

The longer the carbon chain of the substituted olefinic acid or acid anhydride, or ester or half ester thereof, or similar compound, the less vigorous is the condensation reaction. Thus at the upper limit (nine carbon atoms in the carbon chain) the reaction is relatively mild. If there are less than seven carbon atoms in the carbon chain (for example six) the reaction is more vigorous. A still more vigorous reaction is obtained if there are less than five carbon atoms in the carbon chain.

In all cases where I refer in the specification to less than ten carbon atoms in the carbon chain of the substituted olefinic compound, it will be understood that a more vigorous reaction is obtained with compounds having less than seven carbon atoms in the carbon chain, and a still more vigorous reaction with compounds having less than five carbon atoms in the carbon chain. These latter groups (less than seven and less than five) are to be taken as expressly included, although not specifically mentioned because of a desire to shorten the specification.

When reference is made to the maleic grouping in condensable form, it will be understood that it is intended to designate maleic anhydride, a substance yielding maleic anhydride or a maleic ester or similar compound which is capable of condensing to enter the carbon chain of a nonconjugated unsaturated nonhydroxylated aliphatic compound having from ten to twenty-four carbon atoms in the carbon chain. A maleic condensation product may be obtained from any such compound having the maleic grouping, preferably maleic anhydride.

As will be later explained in considerable detail, the presence of the acid or acid anhydride radical in the condensation product is distinctly advantageous, because of the reactions of which the acid or acid anhydride radical is capable and the uses to which such reactions may be put.

A wide variety of nonconjugated unsaturated nonhydroxylated carbon chain compounds having from ten to twenty-four carbon atoms in the carbon chain may be employed. Esters of fatty acids with mono-, di- or poly-hydric alcohols, for example glyceryl or glycol esters, are particularly desirable. The free fatty acids may also be used. Salts of the fatty acids (soaps) may likewise be employed.

When reference is made to the length of the carbon chain as being from ten to twenty-four carbon atoms, it is intended to include compounds having ten carbon atoms, twenty-four carbon atoms or any intermediate number of carbon atoms in the chain. The reference to the length of the carbon chain applies to the carbon chain of the acid. A glyceride, for example, contains three such carbon chains united to a glyceryl group.

As examples of the type of nonconjugated unsaturated nonhydroxylated aliphatic acids having from ten to twenty-four carbon atoms in the carbon chain which I may use, I suggest oleic, linolic, linolenic, clupanodonic and undecylenic. The esters of the nonhydroxylated fatty acids may be either glyceryl esters, which form oils such as corn, olive (triolein), cotton seed, peanut, linseed, sunflower, safflower, perilla, hemp seed, walnut seed, soya, rape seed, tomato seed, neat's foot, lard, codliver, burbet, salmon, cod, menhaden, and many others, all nonconjugated unsaturated nonhydroxylated fatty oils; or esters of other alcohols, for example glycol esters. It will furthermore be understood that mixtures of various esters, or of the esters and the free fatty acids, or of salts of the acids, may be employed if desired.

When I refer to the grouping of a nonconjugated unsaturated nonhydroxylated aliphatic acid having from ten to twenty-four carbon atoms in the carbon chain, I mean to include the acid, and compounds of the acid such as esters of the acid, whether with mono-, di- or poly-hydric-alcohols, and salts of the acid. I do not include herein hydroxylated aliphatic acids, oils, etc., because, while the condensation of my invention may in certain cases be obtained with them, special precautions must be taken because of the tendency of hydroxylated fatty acids, oils, etc., to esterify and gel. A typical hydroxylated fatty oil is castor oil. The question of whether the free acid or the ester or the salt is used is immaterial from the standpoint of the condensation reaction because the condensation reaction with the alkyl substituted olefinic compound having less than ten carbon atoms in its carbon chain appears to involve the carbon chain at an intermediate point between its ends, rather than the carboxyl group or neutralized carboxyl group at the end of the chain. Of course, the character of the product will vary depending upon whether the acid, ester or salt is used.

In the condensation, I may desirably employ one molecular equivalent of nonconjugated unsaturated nonhydroxylated acid or the like to one molecular equivalent of alkyl substituted olefinic compound and subject the mixture to a temperature of between 150° C. and 300° C. and preferably also to high pressure to facilitate the reaction. Pressure may desirably be applied by simply confining the reaction components between the walls of some vessel such as a pressure autoclave and then heating the reaction components. Pressure may also be applied in any other suitable way, as by pumping the reacting components into the vessel or introducing an inert gas under pressure. I have used pressures up to 300 pounds per square inch with success. Of course the desirable pressure will vary with the individual reaction.

A suitable catalyst may be used to accelerate the reaction and to increase the yield. I do not, however, find that a catalyst is necessary.

The condensation reaction may be carried out in the presence of suitable solvents, although this is not usually necessary.

In ordinary practice I prefer not to use sufficient alkyl substituted olefinic compound having less than ten carbon atoms in the carbon chain to saturate all of the double bonds in the fatty acid or fatty oil, etc., having from ten to twenty-four carbon atoms in the carbon chain. The condensation product thus ordinarily has an iodine value. Generally it is sufficient to saturate one-sixth to one-third of the double bonds in the fatty acid, fatty oil, etc. Thus in olive oil one-third of the double bonds (one) is ordinarily saturated, and in linseed oil one-sixth (one). But in individual cases it may be desirable to satisfy more ethylene linkages in the fatty acid or fatty oil, and even to completely saturate them. To saturate all of the ethylene linkages in linseed oil, six molecular equivalents of alkyl substituted olefinic compound having less than ten carbon atoms in the carbon chain are caused to react with one molecular equivalent of linseed oil.

Examples 1 to 4, given below, clearly indicate the way in which my improved condensation product is obtained:

Example 1

In a pressure autoclave, 180 parts by weight of linseed oil are mixed with 20 parts by weight of maleic anhydride (an alkyl di-substituted olefinic acid anhydride). The temperature is maintained at from 250° C. to 260° C. for one hour. The reaction may be obtained satisfactorily at 150° C., but is much slower at this low temperature, and the temperature may be raised to as much as 300° C., but a high temperature may cause some difficulty due to carbonization. After cooling the reaction product is removed from the autoclave. The condensation product is slightly darker and more viscous than the original linseed oil. It is soluble in acetone, ethyl acetate, ether, xylene, carbon tetrachloride, higher petroleum hydrocarbons and turpentine; and semi-soluble in 95% ethyl alcohol. The condensation product is miscible with fatty oils and solutions of nitrocellulose in all proportions. The iodine value is 141.4, as against 190.0 for the original linseed oil. The saponification value is 283 and the acid value is 52.9, in the presence of ethyl alcohol.

Example 2

Into a three-neck flask, equipped with a thermometer, mechanical stirrer and condenser, 200 parts by weight of distilled oleic acid and 60 parts by weight of maleic anhydride are placed and heat is applied until the temperature of the mixture reaches 180° C., at which point the maleic anhydride boils.

The temperature is gradually raised from 180° C. to 250° C. over a period of one hour, during which time the amount of condensed maleic anhydride progressively diminishes. The temperature is maintained at 250° C. to 260° C. until no more maleic anhydride appears to condense. The temperatures given are those found best for carrying out the reaction, although temperatures between 150° C. and 300° C. may be used.

The condensation product is soluble in ethyl alcohol, ether, xylene, carbon tetrachloride and solutions of nitrocellulose, but is substantially insoluble in petroleum hydrocarbons and fatty oils.

Example 3

To 180 parts by weight of linseed oil are added 25 parts by weight of citraconic anhydride (an alkyl di-substituted olefinic acid anhydride) and the mixture is heated in a three-neck flask, equipped with a reflux condenser, at about 250° C. for about three-quarters of an hour. At the end of this period, no further citraconic anhydride appears to condense, indicating completion of the reaction. As a precaution, heating is continued for about 15 minutes longer. The reaction product is less viscous than the maleic condensation product of linseed oil obtained in Example 1, but has the same properties otherwise.

Example 4

A mixture of 25 parts by weight of linseed oil and 2.4 parts by weight of crotonic acid (an alkyl mono-substituted olefinic acid) are heated under pressure at about 250° C. for about two hours. The condensation product has similar properties to the maleic-linseed oil condensation product obtained in Example 1 as respects solubility above noted, and dispersing power, drying action and adherence to metals, noted below.

My novel condensation product may be made with nonconjugated unsaturated nonhydroxylated drying, semi-drying or nondrying fatty oils having from ten to twenty-four carbon atoms in the carbon chain, or mixtures of the same, and the characteristics of the product are, to some extent, dependent upon the character of the oils or the like employed in the reaction. When nonconjugated unsaturated nonhydroxylated drying oils are caused to react with alkyl-substituted olefinic acids or acid anhydrides having less than ten carbon atoms in the carbon chains, the products dry in the air at ordinary temperatures to form hard dry films whether or not driers are used. Likewise, the condensation products of nonconjugated unsaturated nonhydroxylated drying oils generally exhibit thermohardening properties, being convertible at 70° C. to 80°., for example into hard resistant varnish-like films in short periods of time. An example of the drying behavior of the condensation product obtained by Example 1 is as follows:

Example 5

A 1:1 xylene solution of the reaction product obtained in Example 1 to which soluble driers are added to the extent of 0.03% of cobalt, 0.05% of manganese and 0.5% of lead, for example in the form of linoleates or resinates, dries to a hard film at room temperature in about five hours and may be stoved to a hard film at 80° C. in about one and one-half hours. The film produced is not acted upon by water, ethyl alcohol, benzene, or xylene.

It is thus evident that the invention permits of the direct production of thermo-hardening and air-drying lacquers, varnishes, etc.

Without limiting myself to any exact structure for the condensation product, it would appear that the condensation product is an addition product at a double bond in the carbon chain of the nonconjugated unsaturated nonhydroxylated fatty acid or the like to the condensable alkyl substituted olefinic compound or the like.

For example, if linolenic acid reacts with maleic anhydride, the first stage in the reaction appears to be in general as follows. Of course if enough maleic anhydride be present, the same reaction will take place at each double bond in the linolenic acid.

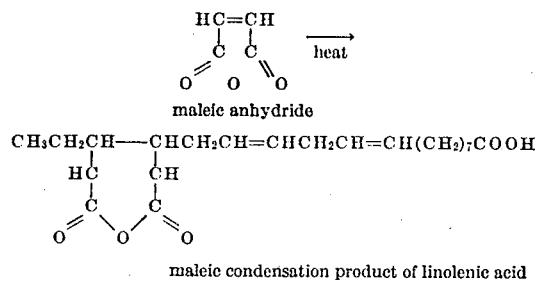

The iodine value of the condensation product confirms the above formula, and indicates that the ethylene linkage of the olefinic compound (in this case maleic anhydride) has been lost during condensation. It should be noted that one of the double bonds in linolenic acid and the ethylene linkage in maleic anhydride appear to have disappeared in the condensation product forming a ring type compound with four carbon atoms in the ring.

The condensation product appears to be characterized by the linkage:

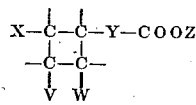

where VCCW is a grouping of less than ten carbon atoms, X and Y are carbon chains without conjugated double bonds and Z is a hydrogen atom, a metal or an ester group.

The reaction above will be modified in well-known manner if a glyceryl ester of linolenic acid instead of linolenic acid be used, or if some other nonconjugated unsaturated nonhydroxylated aliphatic acid having from ten to twenty-four carbon atoms in the carbon chain be employed, or if some other olefinic acid or acid anhydride having less than ten carbon atoms in its carbon chain be used instead of or in mixture with maleic anhydride.

It should be noted that the alkyl-substituted olefinic acid or acid anhydride condensation product of linolenic acid or any similar acid has a carboxyl group capable of reacting at the end of the linolenic or other similar carbon chain, and also an olefinic acid or acid anhydride group capable of reacting. The condensation will take place notwithstanding that both of these groups have been esterified before the condensation reaction, but the presence of the unesterified polar-reactive groups is of great advantage for many purposes as later explained.

When maleic acid is condensed with a nonconjugated unsaturated nonhydroxylated fatty acid or the like, it appears to change to maleic anhydride and the maleic anhydride condensation product results.

Acid or acid anhydride reactions

As noted above, an acid or acid anhydride group of the condensation product is capable of a wide variety of reactions to produce desirable products of various kinds. For example, very satisfactory oil-soluble driers may be manufactured by causing the condensation product of an alkyl-substituted olefinic acid or acid anhydride having less than ten carbon atoms in the carbon chain and a nonconjugated unsaturated nonhydroxylated aliphatic acid or the like having from ten to twenty-four carbon atoms in the carbon chain, particularly a glyceride of such acid, to react with a metallic oxide, hydroxide, carbonate or other similar compound capable of combination with the acid or acid anhydride group of the alkyl-substituted olefinic acid or acid anhydride condensation product. For example, the oxides, hydroxides and carbonates and acetates in the presence of water, and many other salts of lead, cobalt or manganese can be caused to react with the maleic condensation product of linseed oil as described in Example 1, to form driers which are readily soluble in linseed oil and very useful in the paint, varnish and lacquer industry.

A desirable feature of my invention is that the condensation product of alkyl-substituted olefinic acids and acid anhydrides having less than ten carbon atoms in the carbon chain, with nonconjugated unsaturated nonhydroxylated drying oils forms an excellent vehicle or ingredient for a vehicle for paints, etc. This reacts with metallic oxides and hydroxides, and with carbonates and acetates in the presence of water, to form a drier which is chemically combined with the vehicle. Such a drier is made by adding a small percentage of lead oxide to the maleic anhydride condensation product of linseed oil (for example, enough to introduce ½% of lead into the condensation product).

Esterification of the acid or acid anhydride group is frequently desirable. The alcohol used may be either aliphatic or aromatic and either mono-, di- or poly-hydric. Of course, the carbon atoms in the group added by esterification are not counted as part of the carbon chain of the acid or acid anhydride used in making the condensation product.

The esterified condensation product in which the maleic grouping or similar grouping has combined with the grouping of a nonconjugated unsaturated nonhydroxylated fatty drying oil exhibits the same desirable air-drying and thermohardening properties as the unesterified condensation product, and may be used for paint, varnish and lacquer work with success.

Example 6

A typical case of esterification is exhibited when 25 parts by weight of the viscous oil obtained by the interaction of maleic anhydride and linseed oil, as described for instance in Example 1, are mixed with 1.6 parts by weight of ethylene glycol and the mixture is maintained at about 180° C. until the reaction ceases. A 1:1 xylene solution of the reaction product, when treated with a suitable quantity of metallic driers, as described for instance in Example 5, dries at room temperature to a hard film in a somewhat shorter time than that required for linseed oil and, when stoved at 80° C., gives a hard film in about one and one-half hours. The film is not attacked by water, alcohol or xylene.

In the above reaction the ethylene glycol neutralizes the acid anhydride and forms an ester. Of course, if the starting material were the condensation product of linolenic acid instead of its glyceride, esterification takes place at the carboxyl group as well as at the acid anhydride group, as the condensation product is then polar-reactive at two distinct parts of the molecule.

It is possible to manufacture improved varnish or the like by esterifying the condensation product of a nonconjugated unsaturated nonhydroxylated drying oil with an olefinic acid or the like having less than ten carbon atoms in its carbon chain. Glycerine, glycol or other poly-hydric alcohol may be employed in forming the ester. The reaction product should preferably be incorporated with a resin, such as rosin. This mixture may be heated to the required varnish viscosity and then thinned with a common organic solvent.

*Example 7*

Heat together 100 parts by weight of the maleic anhydride condensation product of linseed oil as obtained in Example 1, and 11 parts by weight of glycerine at 230° C. until a drop of the reaction mixture remains clear on cold metal. Then add to the reaction mixture 60 parts by weight of wood rosin and heat at 285° C. for 45 minutes. The product gives an acid number of 25 as compared with 113 for the acid number of the uncondensed mixture.

This product, when cut with petroleum spirits containing drier, dries to a hard, water-resistant film.

The polar-reactive quality of the acid or acid anhydride in an alkyl substituted olefinic acid or acid anhydride having less than ten carbon atoms in the carbon chain is of great importance when its condensation product with a nonconjugated unsaturated nonhydroxylated aliphatic acid or the like having from ten to twenty-four carbon atoms in its carbon chain is used as a metal coating. In this instance the acid or acid anhydride group acts upon the metal which is coated and produces very tenacious adherence of the film. This makes the alkyl substituted olefinic acid or acid anhydride condensation product of a nonconjugated unsaturated nonhydroxylated aliphatic acid or oil or the like having from ten to twenty-four carbon atoms in its carbon chain very desirable as a base or priming coat. The suitability of the alkyl substituted olefinic condensation product of a nonconjugated unsaturated nonhydroxylated acid or the like for priming or base coat purposes is increased when nitrocellulose lacquers are employed for a subsequent coat or coats, because nitrocellulose solutions (for example, nitrocellulose dissolved in ethyl alcohol and ethyl acetate) are completely miscible with the alkyl substituted olefinic condensation product and firm adherence between the condensation product coat and the nitrocellulose coat or coats is thus obtained.

The advantage of the condensation product as a base for nitrocellulose is present whether the alkyl-substituted olefinic compound be an acid or acid anhydride, or whether it be an ester or half ester.

My novel condensation product is very satisfactory for use with nitrocellulose solutions in lacquers, etc. The proportions need not be restricted, although I have found that 20% to 50% of nitrocellulose solution and 80% to 50% of condensed drying oil make a suitable vehicle. The polar-reactive groups in the condensed drying oil give firm adherence.

I believe I am the first to discover that alkyl-substituted olefinic acids and acid anhydrides having less than ten carbon atoms in the carbon chain, preferably less than seven carbon atoms in the carbon chain and still better less than five carbon atoms in the carbon chain, will condense with the carbon chain of a nonconjugated unsaturated nonhydroxylated aliphatic acid, ester, salt, etc. having from ten to twenty-four carbon atoms in the carbon chain. I frequently refer to such nonconjugated unsaturated aliphatic acids, esters, salts, etc., as nonconjugated unsaturated nonhydroxylated fatty acid compounds, or compounds having the fatty acid grouping. It is of course within the ability of any routine chemist to suggest other analogous compounds which may be used without departing from my invention, such as neutralized alkyl-substituted olefinic half esters, etc., which are to be regarded as equivalents of the compounds mentioned. For different compounds, some variations in desirable reaction temperatures and pressures will be found.

Throughout the specification and claims, where I refer to nonconjugated unsaturated nonhydroxylated aliphatic acids having from ten to twenty-four carbon atoms in the carbon chains, or salts or esters thereof, I mean such acids, salts or esters as are unoxidized or nonpolymerized or not sufficiently oxidized or polymerized to interfere with the reactions disclosed herein. Thus, in referring to linseed oil, I mean the product generally known as such, raw or refined, and not linseed oil sufficiently oxidized or polymerized to prevent or seriously interfere with the formation of a condensation product at a double bond. In other words, I do not intend to exclude others from mere esterification of oxidized or polymerized fatty oils by some acidic substance, such as maleic anhydride.

Many of the fish oils contain varying percentages of fatty alcohols, which will of course react with a substance of the type of maleic anhydride to form esters. The esterified fatty alcohols may be allowed to remain in the condensation product, or the alcohols may be removed before condensation takes place.

Where reference is made to poly-hydric alcohols, it is intended to include di-hydric alcohols. Under the designation poly-hydric alcohols, it is intended to include substituted poly-hydric alcohols such as glycol monoethyl ether. Reference to acids is intended to include acid anhydrides and half esters of acids. Reference to esters is intended to include partially completed esters such as half esters.

In view of my invention and disclosure variations and modifications to meet individual whim or particular need will doubtless become evident to others skilled in the art, to obtain all or part of the benefits of my invention without copying the process or product disclosed, and I, therefore, claim all such in so far as they fall within the reasonable spirit and scope of my invention.

Having thus described my invention, what I claim as new and desire to secure by Letters Patent is:

1. The method of producing a resin from a fatty acid, a polybasic acid and a polyhydric alcohol, which comprises heating essentially maleic acid and a nonconjugated, unsaturated, nonhydroxylated aliphatic acid having from ten to twenty-four carbon atoms in the carbon chain at elevated temperatures in the substantial absence of free polyhydric alcohol until reaction between the acids has taken place, and then adding a polyhydric alcohol to the reaction mass and producing the reaction between the acidic groups of the acids and the hydroxyl groups of the polyhydric alcohol.

2. The method of producing a resin from a fatty acid, a polybasic acid and a polyhydric alcohol, which comprises heating essentially maleic acid with linoleic acid at elevated temperatures in the substantial absence of free polyhydric alcohol until the reaction between the acids has taken place, and then adding a polyhydric alcohol to the acid mass and continuing the reaction until the polyhydric alcohol has reacted with the acid mass.

3. The method of producing a resin from a fatty acid, a polybasic acid and a polyhydric alcohol, which comprises heating essentially maleic acid with linolenic acid at elevated temperatures in the substantial absence of free polyhydric alcohol until the reaction between the acids has taken place, and then adding a polyhydric alcohol to the acid mass and continuing the reaction until the polyhydric alcohol has reacted with the acid mass.

4. The method of producing a resin from a fatty acid, a polybasic acid and a polyhydric alcohol, which comprises heating essentially maleic acid with a nonconjugated, unsaturated, nonhydroxylated aliphatic acid having from ten to twenty-four carbon atoms in the carbon chain at a temperature of at least 180° C. in the substantial absence of free polyhydric alcohol, continuing the heating until a substantial quantity of maleic acid has combined with the fatty acid, and then adding a polyhydric alcohol thereto in quantity sufficient to esterify at the acidic group of the fatty acid and at the acidic groups of the maleic acid and continuing the heating until the reaction ceases.

5. The method of producing a resin from a fatty acid, a polybasic acid and a polyhydric alcohol, which comprises heating essentially maleic acid with linoleic acid at a temperature of at least 180° C. in the substantial absence of free polyhydric alcohol, continuing the heating until a substantial quantity of maleic acid has combined with the linoleic acid, and then adding a polyhydric alcohol thereto in quantity sufficient to esterify at the acidic group of the fatty acid and at the acidic groups of the maleic acid and continuing the heating until the reaction ceases.

6. The method of producing a resin from a fatty acid, a polybasic acid and a polyhydric alcohol, which comprises heating essentially maleic acid and linolenic acid at a temperature of at least 180° C. in the substantial absence of free polyhydric alcohol, continuing the heating until a substantial quantity of maleic acid has combined with the linolenic acid, and then adding a polyhydric alcohol thereto in quantity sufficient to esterify at the acidic group of the fatty acid and at the acidic groups of the maleic acid and continuing the heating until the reaction ceases.

7. A fatty acid-polybasic acid-polyhydric alcohol resin produced in accordance with the process of claim 1.

8. A fatty acid-polybasic acid-polyhydric alcohol resin produced in accordance with the process of claim 4.

9. A fatty acid-polybasic acid-polyhydric alcohol resin produced in accordance with the process of claim 5.

10. The method of producing soluble, oil acid-modified polyhydric alcohol-polybasic acid resins, which comprises heating essentially maleic acid and the acids obtainable upon hydrolysis of linseed oil at elevated temperatures in the substantial absence of free polyhydric alcohol until reaction between the acids has taken place, and then adding polyhydric alcohol to the acid mass and continuing the reaction until a homogeneous, soluble resin is obtained.

11. The method of producing soluble, oil acid-modified polyhydric alcohol-polybasic acid resins, which comprises heating essentially maleic acid and the acids of linseed oil at elevated temperatures in the substantial absence of free polyhydric alcohol until reaction between the acids has taken place, and then adding a quantity of polyhydric alcohol sufficient to neutralize the acids and continuing the heating until a homogeneous oil-soluble resin is obtained.

12. The method of producing oil soluble, oil acid-modified polyhydric alcohol-polybasic acid resins, which comprises heating essentially maleic acid and the free acids of linseed oil at approximately 360° F. for at least about 45 minutes in the substantial absence of free polyhydric alcohol, and then adding thereto a quantity of polyhydric alcohol substantially equivalent to the total amount of acids and continuing the heating until a homogeneous oil-soluble resin is obtained.

13. A soluble polyhydric alcohol-maleic acid-linseed oil acid resin produced in accordance with the process of claim 10.

14. An oil-soluble polyhydric alcohol-maleic acid-linseed oil acid resin produced in accordance with the process of claim 11.

EDWIN T. CLOCKER.